(12) United States Patent
Saotome et al.

(10) Patent No.: US 7,043,267 B1
(45) Date of Patent: May 9, 2006

(54) COMMUNICATION DEVICE DISCONNECTING A COMMUNICATION LINE BY DETECTING AN ABNORMAL STATE OF COMPUTER EQUIPMENT

(75) Inventors: Makoto Saotome, Kawasaki (JP); Nobuhide Maruo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 806 days.

(21) Appl. No.: 09/706,854

(22) Filed: Nov. 7, 2000

(30) Foreign Application Priority Data

May 26, 2000 (JP) .............................. 2000-156441

(51) Int. Cl.
*H04Q 7/20* (2006.01)

(52) U.S. Cl. ............... 455/557; 455/556.2; 455/575.6; 710/313

(58) Field of Classification Search ............... 455/556, 455/557, 344, 575, 90, 550, 66, 412, 556.1, 455/556.2, 575.1, 575.2, 90.1, 550.1, 90.3, 455/575.6; 709/227, 217; 320/115, 163, 320/111, 112, 113, 114; 361/90; 710/313
See application file for complete search history.

(56) References Cited

U.S. PATENT DOCUMENTS

| 5,835,585 | A | * | 11/1998 | Morse ........................ 379/424 |
| 5,896,574 | A | * | 4/1999 | Bass, Sr. .................... 455/557 |
| 5,903,849 | A | * | 5/1999 | Selin et al. ................ 455/557 |
| 5,923,673 | A | | 7/1999 | Henrikson |
| 6,067,583 | A | * | 5/2000 | Gilbert ......................... 710/8 |
| 6,101,076 | A | * | 8/2000 | Tsai et al. ..................... 361/90 |
| 6,195,712 | B1 | * | 2/2001 | Pawlowski et al. .......... 710/19 |
| 6,206,480 | B1 | * | 3/2001 | Thompson .................. 361/625 |
| 6,211,649 | B1 | * | 4/2001 | Matsuda ..................... 320/115 |
| 6,255,800 | B1 | * | 7/2001 | Bork .......................... 320/115 |
| 6,308,062 | B1 | * | 10/2001 | Chien et al. ................ 455/420 |
| 6,408,351 | B1 | * | 6/2002 | Hamdi et al. ................ 710/63 |
| 6,516,205 | B1 | * | 2/2003 | Oguma ....................... 455/557 |
| 6,542,092 | B1 | * | 4/2003 | Pan ............................. 455/556 |
| 6,546,262 | B1 | * | 4/2003 | Freadman ................... 455/557 |
| 6,603,744 | B1 | * | 8/2003 | Mizutani et al. ............ 370/310 |
| 6,625,472 | B1 | * | 9/2003 | Farazmandnia et al. .... 455/557 |
| 6,671,814 | B1 | * | 12/2003 | Kubo et al. ................. 713/324 |

FOREIGN PATENT DOCUMENTS

| JP | 10-307738 | 11/1998 |
| JP | 11-149353 | 6/1999 |

* cited by examiner

*Primary Examiner*—Tilahun Gesesse
(74) *Attorney, Agent, or Firm*—Staas & Halsey LLP

(57) ABSTRACT

A communication device is constructed to include a detecting section for detecting a signal peculiar to a universal serial bus (USB) obtained via the USB, and a disconnecting section for disconnecting a line which is being used for a communication when the signal peculiar to the USB is not detected by the detecting section within a predetermined time.

22 Claims, 4 Drawing Sheets

COMMUNICATION DEVICE DISCONNECTING A COMMUNICATION LINE BY DETECTING AN ABNORMAL STATE OF COMPUTER EQUIPMENT

This application claims the benefit of a Japanese Patent Application No. 2000-156441 filed May 26, 2000, in the Japanese Patent Office, the disclosure of which is hereby incorporated by reference.

BACKGROUND OF THE INVENTION

1. Field of the Invention

The present invention generally relates to communication devices, and more particularly to a communication device which has a function of controlling a disconnection of a line which is being used for a communication when an abnormality is detected in a computer equipment which is coupled to the communication device.

2. Description of the Related Art

In a communication using a communication device such as a modem which is coupled to or built into a computer equipment, control related to disconnection of a line which is being used for the communication is in most cases carried out based on a signal received from the computer equipment. For this reason, if a failure or the like occurs in the computer equipment and a line disconnection instruction is not correctly issued from the computer equipment, the line remains in a connected state. When the line remains in the connected state, the accounting continues to be made with respect to the use of the line and the connection to a destination. Recently, there are more occasions to make a communication using a combination of the computer equipment, the communication device and a wireless telephone set. Consequently, in addition to the problem of the continued accounting being made when the failure is generated in the computer equipment, the wear of a battery of the wireless telephone set due to the continued communication is also becoming a problem.

With respect to the above described problems, a first method has been proposed to disconnect the line by detecting a no-communication state which is generated when an abnormality is occurs in the computer equipment. However, according to this first method, the no-communication state is not necessarily caused by the abnormality state of the computer equipment, and it is difficult to accurately detect the abnormal state of the computer equipment. As a result, there is a high possibility that an unwanted disconnection of the line will be made.

On the other hand, a second method has been proposed to transmit an exclusive control code with respect to the communication device when an abnormality is generated in the computer equipment. However, according to this second method, it is necessary to modify the hardware and software of the computer equipment from the existing hardware and software in order to generate the exclusive control code.

As described above, it is conventionally impossible to disconnect the line by accurately detecting the abnormal state of the computer equipment using a simple structure or, to disconnect the line by accurately detecting the abnormal state of the computer equipment without the need to modify the existing hardware and software of the computer equipment.

SUMMARY OF THE INVENTION

Accordingly, it is a general object of the present invention to provide a novel and useful communication device in which the problems described above are eliminated.

Another and more specific object of the present invention is to provide a communication device which can disconnect a line by accurately detecting an abnormal state of a computer equipment, without having to modify existing hardware and software of the computer equipment, and by use of a simple structure.

Still another object of the present invention is to provide a communication device characterized by detecting means for detecting a signal peculiar to a universal serial bus (USB) obtained via the USB, and disconnecting means for disconnecting a line which is being used for a communication when the signal peculiar to the USB is not detected by said detecting means within a predetermined time.

The signal peculiar to the USB may be selected from a group of a frame start (SOF) signal, an interrupt transfer request signal, a control transfer signal and a bulk IN transfer request signal.

According to the communication device of the present invention, it is possible to disconnect a line by accurately detecting an abnormal state of a computer equipment, without having to modify existing hardware and software of the computer equipment, and by use of a simple structure.

Other objects and further features of the present invention will be apparent from the following detailed description when read in conjunction with the accompanying drawings.

DESCRIPTION OF THE PREFERRED EMBODIMENTS

A description will be given of various embodiments of a communication device according to the present invention, by referring to the accompanying drawings.

Figure 1:
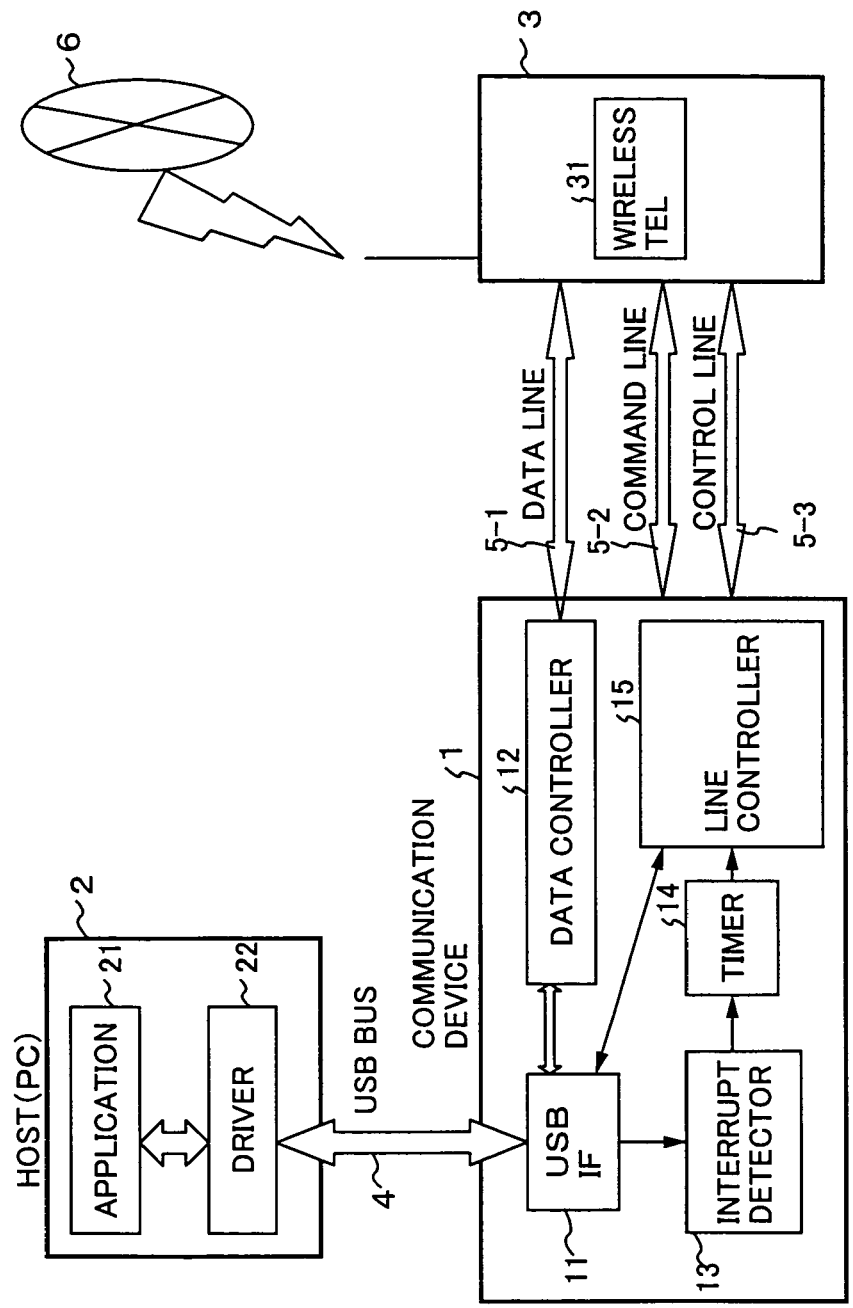
FIG. 1 is a system block diagram showing a first embodiment of a communication device according to the present invention.

FIG. 1 is a system block diagram showing a first embodiment of the communication device according to the present invention. In this embodiment, the present invention is applied to a case where a host unit communicates via the communication device and a wireless telephone set.

As shown in FIG. 1, a communication device 1 connects a host unit 2 and a wireless telephone set 3. The communication device 1 is connected to the host unit 2 via a universal serial bus (USB) 4. In addition, the communication device 1 is connected to the wireless telephone set 3 via a data line 5-1, a command line 5-2 and a control line 5-3. The wireless telephone set 3 is connected to a network 6 via a line, and connects to a remote unit (not shown) via the network 6.

The communication device 1 includes a USB interface (USBIF) 11, a data controller 12, an interrupt detector 13, a timer 14 and a line controller 15. The host unit 2 is formed by a computer equipment such as a personal computer which has a known structure including a CPU (not shown). An application software 21 and a driver software 22 are executed by the CPU of the computer equipment which forms the host unit 2. The wireless telephone set 3 is formed by a portable telephone set, a PHS telephone set or the like having a known wireless telephone function 31.

The USB 4 is a standardized serial bus which connects a personal computer and a peripheral equipment thereof. By transmitting signals using the USB 4, it is possible to manufacture the peripheral equipment at a low cost. Hence, existing personal computers employ the USB 4 as a standard, as an external bus. This embodiment effectively utilizes the USB 4.

During a normal operation, the host unit 2 connects via the application software 21 and the driver software 22 to the line, via the communication device 1 and the wireless telephone set 3, to transmit and receive data. The communication device 1 detects a change in the data transmitted from the wireless telephone set 3 and received via the data line 5-1 or, a change in a command received via the command line 5-2, and stores change information related to the detected change in an internal buffer (not shown) of the communication device 1. For example, the internal buffer may be provided within the data controller 12, within the line controller 15 or, within the USBIF 11.

In order to detect a change of state of the communication device 1, the host unit 2 issues an interrupt transfer request with respect to the communication device 1 at predetermined time intervals. The interrupt transfer request is made by transmitting an interrupt transfer request signal to the communication device 1 via the USB 4. This interrupt transfer request signal is peculiar to the USB 4. An interrupt transfer is made when periodically transferring small amounts of data from the communication device 1 to the host unit 2. For example, the change information stored in the internal buffer is transferred from the communication device 1 to the host unit 2 by the interrupt transfer. Because of the structure of the USB 4, a data transfer cannot be started from the communication device 1 even in the case of the interrupt transfer. The data transfer is started by a polling operation which is carried out by the host unit 2 to determine whether or not data to be transferred to the host unit 2 exists within the communication device 1.

The communication device 1 constantly monitors the existence of the interrupt transfer request made via the USB 4. More particularly, the interrupt detector 13 detects the interrupt transfer request signal which is received via the USBIF 11. When a detected time interval of the interrupt transfer request signal is within a detection time interval which is preset in the timer 14, the interrupt detector 13 judges that the operation of the host unit 2 is normal, and the communication via the line which is connected to the wireless telephone set 3 is continued. In this case, the data received via the USB 4 are transferred to the wireless telephone set 3 via the USBIF 11, the data controller 12 and the data line 5-1. In addition, the command received via the USB 4 is transferred to the wireless telephone set 3 via the USBIF 11, the line controller 15 and the command line 5-2. Furthermore, the control signal received via the USB 4 is transferred to the wireless telephone set 3 via the USBIF 11, the line controller 15 and the control line 5-3.

On the other hand, when the detected time interval of the interrupt transfer request signal is longer than the detection time interval preset in the timer 14, the interrupt detector 13 judges that the operation of the host unit 2 is abnormal, and the line controller 15 forcibly ends the communication by disconnecting the line which is connected to the wireless telephone set 3. The line can be disconnected by a line disconnecting method which supplies a line disconnect instruction to the wireless telephone set 3 or a line disconnecting method which cuts OFF a power supply of the wireless telephone set 3. The connection of the line which is being used for the communication can be disconnected by supplying a command or a control signal for disconnecting the line from the line controller 15 to the wireless telephone set 3 via the command line 5-2 or the control line 5-3. In this case, it is possible to prevent the accounting from being continued unnecessarily with respect to the use of the line and the connection to a destination. In addition, the power supply of the wireless telephone set 3 can be cut OFF by supplying the command or the control signal for cutting OFF the power supply from the line controller 15 to the wireless telephone set 3 via the command line 5-2 or the control line 5-3. In this case, it is not only possible to prevent the accounting from being continued unnecessarily with respect to the use of the line and the connection to the destination, but it is also possible to prevent unnecessary wear of a battery of the wireless telephone set 3.

Figure 2:
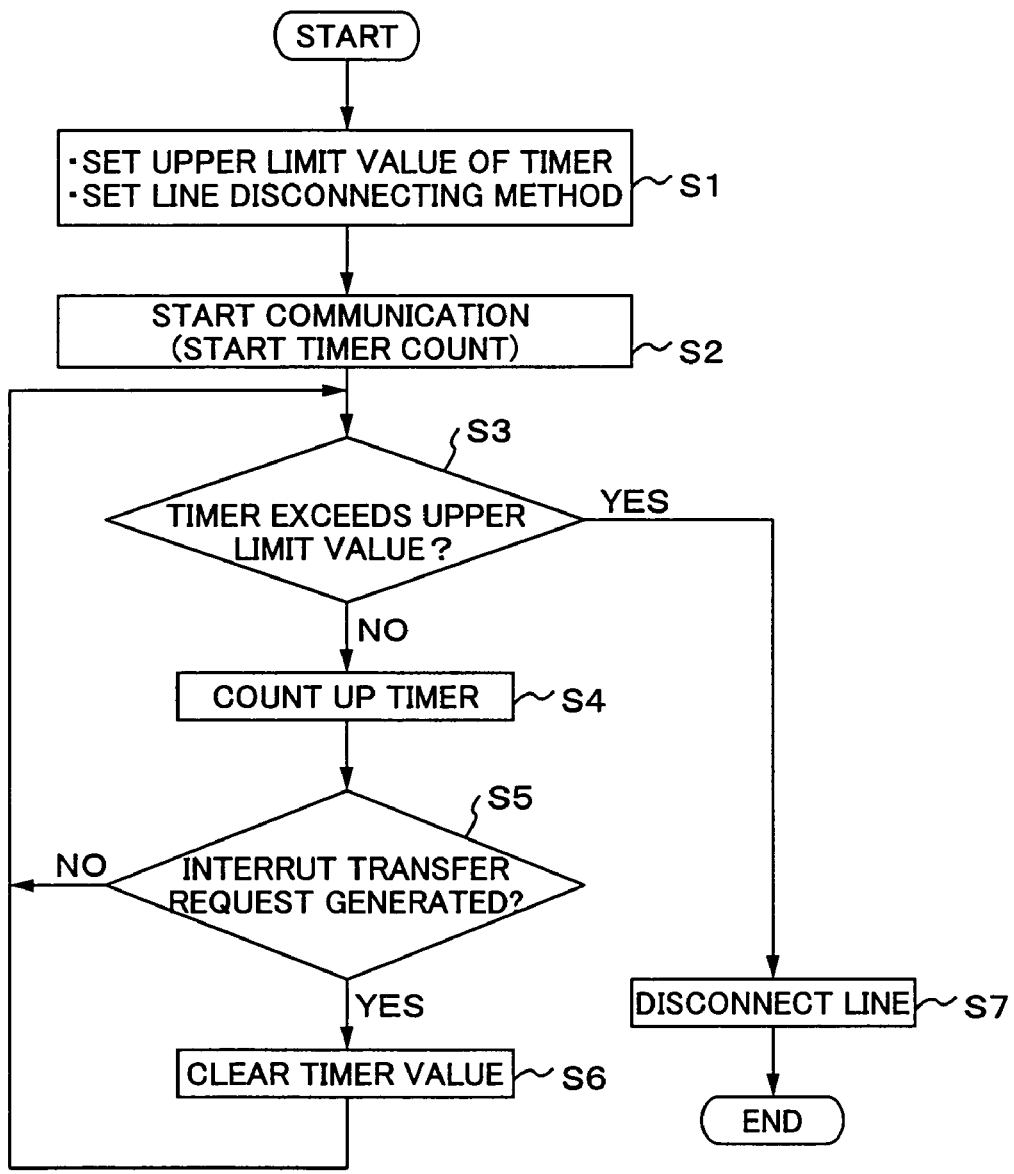
FIG. 2 is a flow chart for explaining the operation of the first embodiment.

FIG. 2 is a flow chart for explaining the operation of this first embodiment. In FIG. 2, a step S1 sets an upper limit value of the timer 14, and sets the line disconnecting method which is to be employed. A step S2 starts a communication via the wireless telephone set 3 based on a communication request signal from the host unit 2, and starts a count of the timer 14. A step S3 decides whether or not a counted value of the timer 14 exceeds the set upper limit value. If the decision result in the step S3 is NO, a step S4 counts up the counted value of the timer 14. A step S5 decides whether or not an interrupt transfer request is issued with respect to a concerned end point. The end point refers to a part forming an information source or sink during the communication between the host unit 2 and the communication device 1. The process returns to the step S3 if the decision result in the step S5 is NO. On the other hand, if the decision result in the step S5 is YES, a step S6 clears the counted value of the timer 14, and the process returns to the step S3. In addition, if the decision result in the step S3 is YES, a step S7 disconnects the line which is being used for the communication, and the process ends.

The signal peculiar to the USB 4 is of course not limited to the interrupt transfer request signal, and other signals such as a frame start (SOF) signal, a control transfer signal and a bulk IN transfer request signal may be used. The SOF signal is a packet which is issued from the host unit 2 for every 1.0 ms±0.05%, for example, and indicates the start of each frame. This SOF signal is not issued with respect to a specific communication device or end point, but is issued periodically if the host unit 2 has an appropriate configuration. On the other hand, the control transfer signal is issued when using a control transfer mode in which the communication device 1 transfers configuration information thereof or the like to the host unit 2 and the host unit 2 transfers configuration information thereof or the like to the communication device 1, and also when transferring a small amount of data. The control transfer signal corresponds to a standard device request or the like which is defined by the USB 4, and thus, the control transfer mode is supported without exception by any unit or device which supports the USB 4. In addition, even in the case of a request other than the standard device request, it is possible to use a vendor request as the control transfer signal to have a peculiar meaning.

When using the bulk IN transfer, it is possible to use the bulk IN transfer request signal similarly to the interrupt transfer request signal described above.

When using the SOF signal as the signal peculiar to the USB 4, it is possible to detect the abnormality related to the hardware of the host unit such as the cutting OFF of the power supply of the host unit 2. In addition, when using the interrupt transfer request signal or the control transfer signal as the signal peculiar to the USB 4, it is possible to detect the abnormality of the host unit 2 such as hang-up which is caused by software, because both the interrupt transfer and the control transfer are not only dependent on the hardware of the host unit 2 but are also dependent on the operation of the application software 21 and the driver software 22 for carrying out the communication. The above described signals peculiar to the USB 4 are not implemented exclusively for detecting the abnormality of the host unit 2, and are used during the normal operation of the host unit 2. For this reason, it is unnecessary to modify the hardware and software of the host unit 2 in order to realize the present invention.

Figure 3:
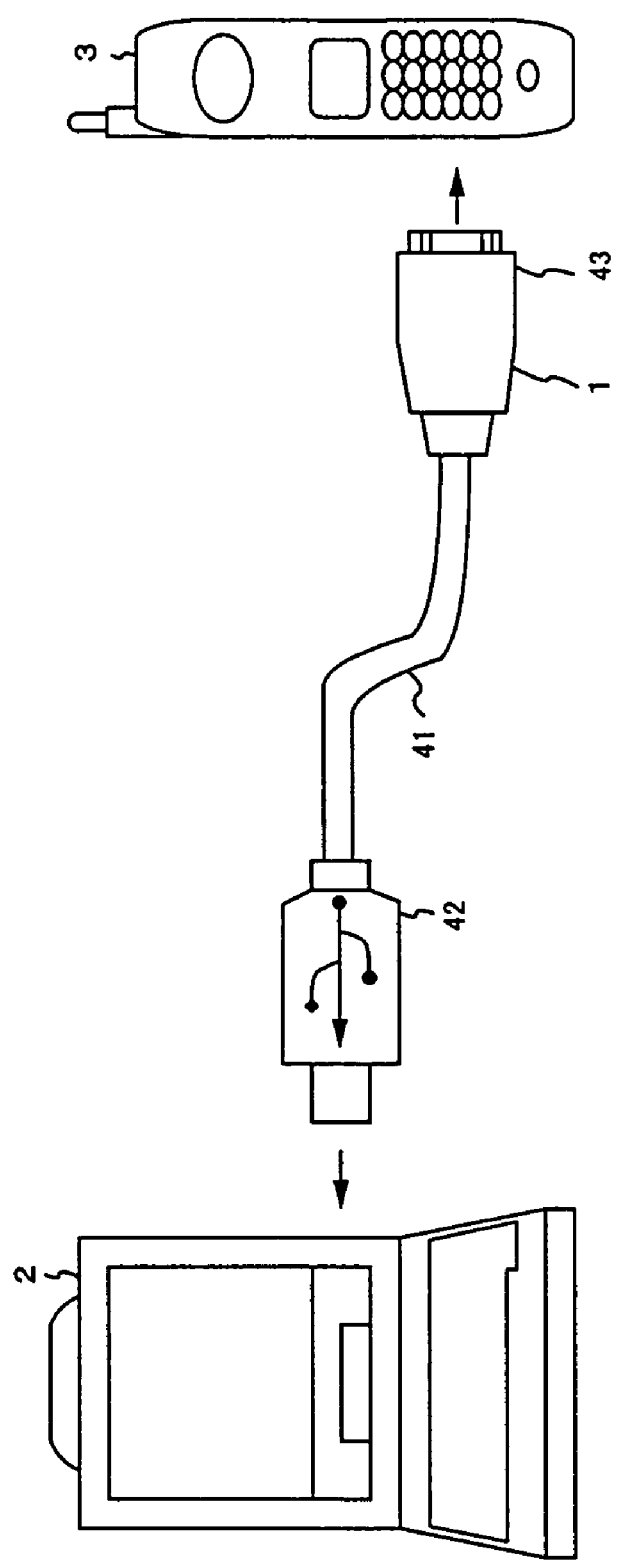
FIG. 3 is a diagram for explaining the first embodiment.

FIG. 3 is a diagram for explaining this first embodiment. In FIG. 3, those parts which are the same as those corresponding parts in FIG. 1 are designated by the same reference numerals, and a description thereof will be omitted. In FIG. 3, a connector 42 is provided on one end of a cable 41, and a connector 43 is provided on the other end of the cable 41. The connector 42 is connected to a USB connector of the host unit 2, and the connector 43 is connected to a connector of the wireless telephone set 3. The cable 41 forms the USB 4. In addition, the communication device 1 shown in FIG. 1 is built into the connector 43. Accordingly, pins of the connector 43 are provided in correspondence with the data line 5-1, the command line 5-2 and the control line 5-3. By providing the communication device 1 within the connector 43, it is possible to connect the host unit 2 and the wireless telephone set 3 to the communication device 1 having the function of automatically disconnecting the line, by simply connecting the host unit 2 and the wireless telephone set 3 by the cable 41.

Figure 4:
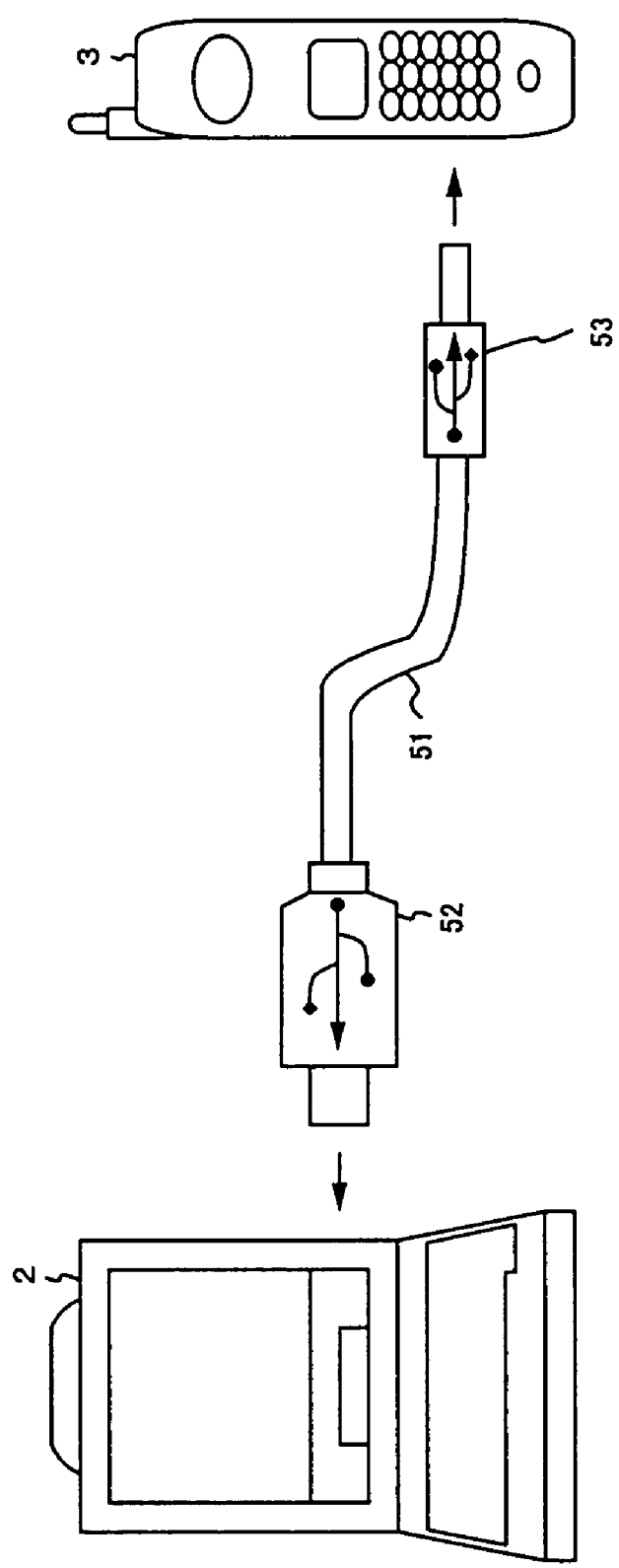
FIG. 4 is a diagram for explaining a second embodiment of the communication device according to the present invention.

FIG. 4 is a diagram for explaining a second embodiment of the communication device according to the present invention. In FIG. 4, those parts which are the same as those corresponding parts in FIG. 3 are designated by the same reference numerals, and a description thereof will be omitted. In FIG. 4, a connector 52 is provided on one end of a cable 51, and a connector 53 is provided on the other end of the cable 51. The connector 52 is connected to a USB connector of the host unit 2, and the connector 53 is connected to a connector of the wireless telephone set 3. The cable 51 forms the USB 4. In addition, the communication device 1 shown in FIG. 1 is built into the host unit 2 or the wireless telephone set 3. By providing the communication device 1 within the host unit 2 or the wireless telephone set 3, it is possible to connect the host unit 2 and the wireless telephone set 3 to the communication device 1 having the function of automatically disconnecting the line, by simply connecting the host unit 2 and the wireless telephone set 3 by the cable 51.

Next, a description will be given of a third embodiment of the communication device according to the present invention. In this third embodiment, a log storage section is further provided to store a log of the disconnection of the line, in addition to the structure of the first or second embodiment described above. For the sake of convenience, it is assumed in this third embodiment that the log storage section is formed by the internal buffer of the communication device 1. However, it is of course possible to form the log storage section by a memory or the like which is independent from the internal buffer. Moreover, the log storage section may be provided within the host unit 2 or within the wireless telephone set 3. By providing the log storage section and storing the log of the disconnection of the line, it is possible to access the log at an arbitrary time from the host unit 2 or, to automatically access the log and notify the log to the user of the host unit 2.

When restoring the host unit 2, the line controller 15 may re-connect to the line which was disconnected, using the log which is stored in the log storage section.

Next, a description will be given of a fourth embodiment of the communication device according to the present invention. In this fourth embodiment, a notifying section is further provided to notify the disconnection of the line to the host unit 2, in addition to the structure of any one of the first through third embodiments described above. In this fourth embodiment, it is assumed for the sake of convenience that the notifying section is formed by the line controller 15. In other words, the line controller 15 of this fourth embodiment instructs the disconnection of the line to the wireless telephone set 3, and also notifies the disconnection of the line to the host unit 2 via the USBIF 11 and the USB 4.

It is possible to employ a known notifying means when notifying the disconnection of the line to the user of the host unit 2. In other words, the disconnection of the line may be notified to the user by a display output using LED or the like, and an audio output using a buzzer, a melody, voice message or the like. In addition, in a case where an electronic mail function is provided in the wireless telephone set 3 for sending electronic mail, this electronic mail function may be used to notify the disconnection of the line to a manager or the like at a remote location by sending an electronic mail.

Further, the present invention is not limited to these embodiments, but various variations and modifications may be made without departing from the scope of the present invention.

What is claimed is:

1. A communication device comprising:
   detecting means for detecting a signal peculiar to a universal serial bus (USB) obtained via the USB; and
   disconnecting means for disconnecting a line which is being used for a communication when the signal peculiar to the USB is not detected by said detecting means within a predetermined time.

2. The communication device as claimed in claim 1, wherein the signal peculiar to the USB is selected from the group consisting of a frame start (SOF) signal, an interrupt transfer request signal, a control transfer signal, and a bulk IN transfer request signal.

3. The communication device as claimed in claim 2, wherein said disconnecting means instructs a disconnection of the line which is being used for the communication via a command line or a control line, with respect to a wireless telephone set which is coupled to the communication device.

4. The communication device as claimed in claim 3, wherein said disconnecting means disconnects the line which is being used for the communication by cutting OFF a power supply of the wireless telephone set.

5. The communication device as claimed in claim 3, wherein said detecting means and said disconnecting means are built into a connector of a cable connecting a computer equipment and a wireless telephone set.

6. The communication device as claimed in claim 3, wherein said detecting means and said disconnecting means are built into one of a computer equipment and a wireless telephone set which are coupled via the communication device.

7. The communication device as claimed in claim 1, wherein said disconnecting means instructs a disconnection of the line which is being used for the communication via a command line or a control line, with respect to a wireless telephone set which is coupled to the communication device.

8. The communication device as claimed in claim 7, wherein said disconnecting means disconnects the line which is being used for the communication by cutting OFF a power supply of the wireless telephone set.

9. The communication device as claimed in claim 1, further comprising:
notifying means for providing notification of the disconnection of the line which is being used for the communication.

10. The communication device as claimed in claim 9, wherein said notifying means provides notification of the disconnection of the line which is being used for the communication using an electronic mail function of a wireless telephone set which is coupled to the communication device.

11. The communication device as claimed in claim 1, further comprising:
log storage means for storing a log of a disconnection of the line.

12. The communication device as claimed in claim 11, further comprising:
control means for re-connecting to the line which was disconnected using the log of the disconnection of the line stored in said log storage means, when restoring a computer equipment which is coupled to the communication device via the USB.

13. The communication device as claimed in claim 1, wherein said detecting means and said disconnecting means are built into a connector of a cable connecting a computer equipment and a wireless telephone set.

14. The communication device as claimed in claim 1, wherein said detecting means and said disconnecting means are built into one of a computer equipment and a wireless telephone set which are coupled via the communication device.

15. A communication device comprising:
a detecting unit configured to detect a signal peculiar to a universal serial bus (USB) obtained via the USB; and
a disconnecting unit configured to disconnect a line that is being used for communication when the signal peculiar to the USB is not detected by said detecting unit within a predetermined time.

16. The communication device as claimed in claim 15, wherein the signal peculiar to the USB is selected from the group consisting of a frame start (SOF) signal, an interrupt transfer request signal, a control transfer signal, and a bulk IN transfer request signal.

17. The communication device as claimed in claim 15, further comprising:
a notifying unit configured to notify a disconnection of the line that is being used for the communication.

18. The communication device as claimed in claim 15, further comprising:
a log storage unit configured to store a log of the disconnection of the line.

19. The communication device as claimed in claim 15, wherein said detecting unit and said disconnecting unit are built into a connector of a cable connecting computer equipment and a wireless telephone set.

20. The communication device as claimed in claim 15, wherein said detecting unit and said disconnecting unit are built into one of computer equipment and a wireless telephone set, which are coupled via the communication device.

21. A communication controller, comprising:
a communication device;
a computer device connected to the communication device via a universal serial bus (USB), the computer device sending a communication request signal peculiar to the USB, to the communication device via the USB; and
a wireless telephone connected to the communication device via a communication line, the communication device disconnecting the communication line when the communication request signal is not detected by the communication device within a predetermined amount of time.

22. A communication device connected to a computer device via a universal serial bus (USB), and connected to a wireless telephone via a communication line, the communication device comprising:
an interrupt detector detecting a communication request signal peculiar to the USB received from the computer device via the USB, and determining whether the communication request signal is received within a predetermined detection time; and
a line controller disconnecting the communication line when the communication request signal is not received within the predetermined detection time.

* * * * *